(12) United States Patent
Maehara

(10) Patent No.: US 9,441,694 B2
(45) Date of Patent: Sep. 13, 2016

(54) FRICTION PAD ASSEMBLY FOR DISK BRAKE

(71) Applicant: AKEBONO BRAKE INDUSTRY CO., LTD., Tokyo (JP)

(72) Inventor: Toshifumi Maehara, Chuo-ku (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/390,033

(22) PCT Filed: Mar. 15, 2013

(86) PCT No.: PCT/JP2013/057535
§ 371 (c)(1),
(2) Date: Oct. 2, 2014

(87) PCT Pub. No.: WO2013/150881
PCT Pub. Date: Oct. 10, 2013

(65) Prior Publication Data
US 2015/0114773 A1   Apr. 30, 2015

(30) Foreign Application Priority Data

Apr. 5, 2012   (JP) .................. 2012-086733

(51) Int. Cl.
*F16D 69/04* (2006.01)
*B61H 5/00* (2006.01)
*F16D 65/092* (2006.01)

(52) U.S. Cl.
CPC .............. *F16D 69/04* (2013.01); *B61H 5/00* (2013.01); *F16D 65/092* (2013.01); *F16D 69/0408* (2013.01)

(58) Field of Classification Search
CPC ........ F16D 69/04; F16D 65/092; B61H 5/00
USPC ......... 188/250 G, 250 B, 250 R, 250 E, 73.1
See application file for complete search history.

(56) References Cited

U.S. PATENT DOCUMENTS 3,198,294 A  *  8/1965  Stacy .............................. 188/234
3,297,117 A  *  1/1967  Freholm ........................ 188/234
(Continued)

FOREIGN PATENT DOCUMENTS

| CN | 1804422 A | 7/2006 |
|----|-----------|--------|
| CN | 1811216 A | 8/2006 |

(Continued)

OTHER PUBLICATIONS

Extended European Search Report issued Jan. 4, 2016 in European Patent Application No. 13773030.5.

(Continued)

*Primary Examiner* — Thomas J Williams
*Assistant Examiner* — Mariano Sy
(74) *Attorney, Agent, or Firm* — Drinker Biddle & Reath LLP

(57) ABSTRACT

A unit friction pad assembly constituting a disk brake friction pad assembly includes a lining assembly which is oscillatably inserted into the guide hole portion of a guide plate to transmit a braking torque from a plate engagement portion to the guide plate and is urged toward the guide plate by a spring member, and a clearance hold mechanism for holding a clearance between the guide plate and torque receiving plate.

5 Claims, 8 Drawing Sheets

(56) References Cited

U.S. PATENT DOCUMENTS

| | | | |
|---|---|---|---|
| 4,501,347 A * | 2/1985 | Cerny et al. | 188/250 G |
| 4,535,874 A * | 8/1985 | Pollinger et al. | 188/73.1 |
| 5,538,108 A * | 7/1996 | Russo | 188/250 E |
| 5,934,418 A * | 8/1999 | Wirth | 188/73.1 |
| 6,210,763 B1 | 4/2001 | Katoh et al. | |
| 6,478,125 B1 * | 11/2002 | Russo et al. | 188/250 E |
| 7,051,847 B2 * | 5/2006 | Wirth | 188/250 G |
| 7,648,007 B2 * | 1/2010 | Russo et al. | 188/250 E |
| 8,215,461 B2 * | 7/2012 | Holme et al. | 188/250 G |
| 8,544,617 B2 | 10/2013 | De Soccio | |
| 8,919,503 B2 * | 12/2014 | Hiramatsu et al. | 188/73.31 |
| 2006/0151267 A1 | 7/2006 | Russo et al. | |
| 2006/0237270 A1 * | 10/2006 | Maehara | 188/250 R |
| 2011/0114426 A1 | 5/2011 | Soccio | |
| 2012/0298458 A1 | 11/2012 | Hiramatsu et al. | |

FOREIGN PATENT DOCUMENTS

| | | | |
|---|---|---|---|
| CN | 101529114 A | 9/2009 | |
| CN | 102052417 A | 5/2011 | |
| EP | 0342743 A1 | 11/1989 | |
| EP | 2 085 637 A1 | 8/2009 | |
| EP | 2363615 A1 | 9/2011 | |
| JP | H09-173510 A | 7/1997 | |
| JP | H10-507250 A | 7/1998 | |
| JP | H11-79799 A | 3/1999 | |
| JP | 2008-133948 A | 6/2008 | |
| JP | 2011-137519 A | 7/2011 | |
| JP | EP 2363615 A1 * | 9/2011 | F16D 65/092 |
| WO | WO 2011081178 A1 * | 7/2011 | |

OTHER PUBLICATIONS

Notification of Reasons for Refusal issued Mar. 22, 2016 in counterpart Japanese Patent Application No. 2012-086733 (2 pages) with an English Translation (7 pages).

Notification of the First Office Action issued Mar. 15, 2016 in counterpart Chinese Patent Application No. 201380018834.9 (5 pages) with an English Translation (7 pages).

* cited by examiner

FRICTION PAD ASSEMBLY FOR DISK BRAKE

TECHNICAL FIELD

The present invention relates to an improved friction pad assembly for a disk brake.

BACKGROUND ART

A disk brake apparatus includes a disk rotor to be fixed to an axle, a disk brake friction pad assembly constituted of a torque receiving plate disposed opposed to the disk rotor and a lining member assembled to the disk rotor side surface of the torque receiving plate, and a brake caliper to be fixed to a vehicle body frame and including therein an actuator for advancing and retreating the torque receiving plate with respect to the disk rotor, whereby a braking force is generated by sliding friction caused when the torque receiving plate is advanced toward the disk rotor to thereby press the lining member against the disk rotor.

In a disk brake apparatus for a railway vehicle, since a disk rotor and a friction pad assembly for a disk brake are large in size, when a lining member to be pressed against the disk rotor is formed of an integral part, such area of the lining member as is not contacted with the disk rotor is increased due to the undulation of the disk rotor caused by frictional heat or the like, whereby stable frictional area cannot be maintained and thus stable braking characteristics cannot be provided.

Also, when the lining member is rotated unexpectedly due to contact with the disk rotor, the loss transmission of the braking torque can occur and braking noises can occur. This causes the need of a device for restricting the rotation of the lining member, which increases the number of parts. The increased number of parts incurs the increased cost and the increased the number of assembling steps, thereby lowering the productivity.

In solving such problem, there is provided a friction pad assembly for a disk brake, comprising: a plurality of lining assemblies swingably (oscillatably) supported by a guide plate to be pressed against a disk rotor each including, in its back plate portion fixed to the back surface of a friction member, a plate engaging section having an outer peripheral surface swingably engaged with a guide hole section formed in the guide plate and a retaining flange section having a larger outer diameter than the guide hole section, thereby transmitting braking torque acting due to contact between the disk rotor and friction member from the plate engaging section to the guide plate; and, a plurality of link plates interposed between the back plate portion and a torque receiving plate fixed to the guide plate with a clearance from the back plate portion and straddling over the plurality of lining assemblies for applying pressure from the torque receiving plate to the lining assemblies (see the patent reference 1).

In the thus-structured friction pad assembly for a disk brake, each link plate includes a single contact curved face to be contacted with and swingably supported by the link support portion of the torque receiving plate, plurality of back plate contact curved faces to be contacted with the centrally situated link contact section of the back plate portion of each lining assembly for supporting the lining assembly swingably, and a rotation regulating portion loosely engageable with an engaging hole formed in the back plate portion of each lining assembly at a position distant from the center thereof for regulating the swing motion of each lining assembly.

That is, since the member for receiving the braking torque from the lining assembly and the member for applying the pressure to the lining assembly are provided separately, the braking torque providing a large load is not applied to contact portions where the plate contact curved faces and back plate contact curved faces for applying the pressure to the lining assemblies are contacted with the torque receiving plate. Therefore, the contact portions for transmitting the pressure need not be engaged by a firm engaging device such as a ball joint for receiving the braking torque. Thus, the working precision can be eased to thereby realize the reduced cost and enhanced productivity.

Also, since the rotation regulating portion for regulating the swing motion of the lining assemblies is realized by the engagement between the engaging holes of the back plate portions and the rotation regulating portions projects on the link plate, there can be avoided the occurrence of inconveniences such as the increased cost caused by the increased number of parts and the lowered productivity due to the increased number of assembling steps.

CITATION LIST

Patent Documents

PATENT DOCUMENT 1: Japanese Patent Publication No. 2008-133948

SUMMARY OF INVENTION

Technical Problem

In the friction pad assembly for a disk brake disclosed in the patent document 1, the spacer, which is a frame member contactable with the peripheral edge portion of the guide plate, is sandwiched by a guide plate and a torque receiving plate respectively having a flat-plate like shape to thereby define, between the torque receiving plate and back plate portion, a link storage space for arranging a link plate therein.

Thus, the flat-plate shaped torque receiving plate for applying the pressure to the plurality of lining assemblies must have a thickness of sufficient rigidness and, when not, there is a possibility that it is difficult to apply the pressure equally to the plurality of lining assemblies. In the case of the torque receiving plate the thickness of which is increased for enhanced rigidity, the weight is increased to thereby incur the increased cost.

The invention aims at solving the above problem and thus it is an object of the invention to provide a friction pad assembly for a disk brake which, by easing the working precision of parts used and reducing the weights of the parts, can realize the reduced cost and enhanced productivity.

Solution to Problem

The above object of the invention is attained by the following structures.

(1) A disk brake friction pad assembly in which a plurality of lining assemblies are oscillatably supported by a guide plate for receiving a braking torque and the lining assemblies are pressed to a disk rotor, wherein each of the lining assemblies includes, in a back plate portion thereof fixed to a back of a friction member, a plate engagement portion with its outer peripheral surface oscillatably engaged with a guide hole portion formed in the guide plate and a retaining flange portion having an outer diameter larger than the guide hole portion, wherein each of the lining assemblies is inserted into the guide hole portion from the back side of the guide plate, transmits a braking torque applied when the disk rotor contacts with the friction member from the plate engagement portion to the guide plate, wherein each of the lining assemblies is supported and urged toward the guide plate by a spring member provided on the back side of the back plate portion, and wherein a clearance hold mechanism for holding a clearance between the guide plate and a torque receiving plate is provided in the vicinity of a central portion of the torque receiving plate and the guide plate, the torque receiving plate being spaced by a clearance from the back plate portion and an outer periphery of the torque receiving plate being fixed to the guide plate.

(2) The disk brake friction pad assembly according to the above (1), wherein a rotation preventive plate straddling over the lining assemblies to apply a pressure from the torque receiving plate to the lining assemblies is provided between the torque receiving plate and the guide plate, and the rotation preventive plate includes a rotation preventive mechanism engaged with an engagement portion formed distant from the center of the back of each back plate portion to prevent each lining assembly against rotation and an opening through which the clearance hold mechanism penetrates.

(3) The disk brake friction pad assembly according to the above (2), wherein the rotation preventive plate includes a plurality of curved projecting portions formed so as to project toward the center of the back of each back plate portion.

(4) The disk brake friction pad assembly according to the above (3), wherein the spring member is a disc spring having a plate thickness smaller than a height of the curved projecting portion and having a spring constant of 0.3-0.8 N/mm/mm$^2$, and is mounted between the back plate portion and the torque receiving plate within the range of 0-60% of an allowable deflection quantity.

(5) The disk brake friction pad assembly according to any one of the above (1) to (4), wherein the clearance hold mechanism includes a spacer member interposed between the guide plate and the torque receiving plate and a fastening member penetrating through the guide plate, the spacer member and the torque receiving plate to fix them together.

(6) The disk brake friction pad assembly according to any one of the above (1) to (5), wherein the clearance hold mechanism swells at least one of a portion of the guide plate and a portion of the torque receiving plate in an opposing direction into contact with the other, and fixes the contacted portion.

According to the above-structured disk brake friction pad assembly, a braking torque applied to the lining assembly in braking is transmitted to the guide plate and is further transmitted direct to the torque receiving plate with the guide plate fixed thereto.

Pressure pressing the lining assembly against the disk rotor is applied from the torque receiving plate through the spring member to the back plate portion of the lining assembly.

That is, since a member for receiving the braking torque from the lining assembly and a member for applying the pressure to the lining assembly are provided separately, a braking torque providing a large load is not applied to the contact portion between the spring member for applying the pressure to the lining assembly and lining assembly nor the contact portion between the spring member and torque receiving plate.

While the clearance hold mechanism is provided in the vicinity of the central portion of the torque receiving plate with its outer peripheral portion fixable to the guide plate spaced a clearance from the back plate portion of the lining assembly and guide plate, this mechanism can support a portion of the pressure applied to the torque receiving plate in the vicinity of the central portion of the torque receiving plate. Thus, the rigidity of the torque receiving plate with its outer peripheral portion fixed to the guide plate is higher than when the clearance hold mechanism 40 is not provided, thereby being able to reduce the plate thickness of the torque receiving plate itself.

Therefore, due to the eased working precision of parts used and the reduced weight thereof, reduced cost and enhanced productivity can be realized.

DESCRIPTION OF EMBODIMENTS

Description is given specifically of a friction pad assembly for a disk brake according to an embodiment of the invention with reference to the drawings.

FIGS. 1 to 7 show a friction pad assembly for a disk brake according to an embodiment of the invention, and FIGS. 8(a) to 8(c) are arrow views to explain the procedure for assembling unit friction pad assemblies constituting a friction pad assembly for a disk brake.

Figure 1:
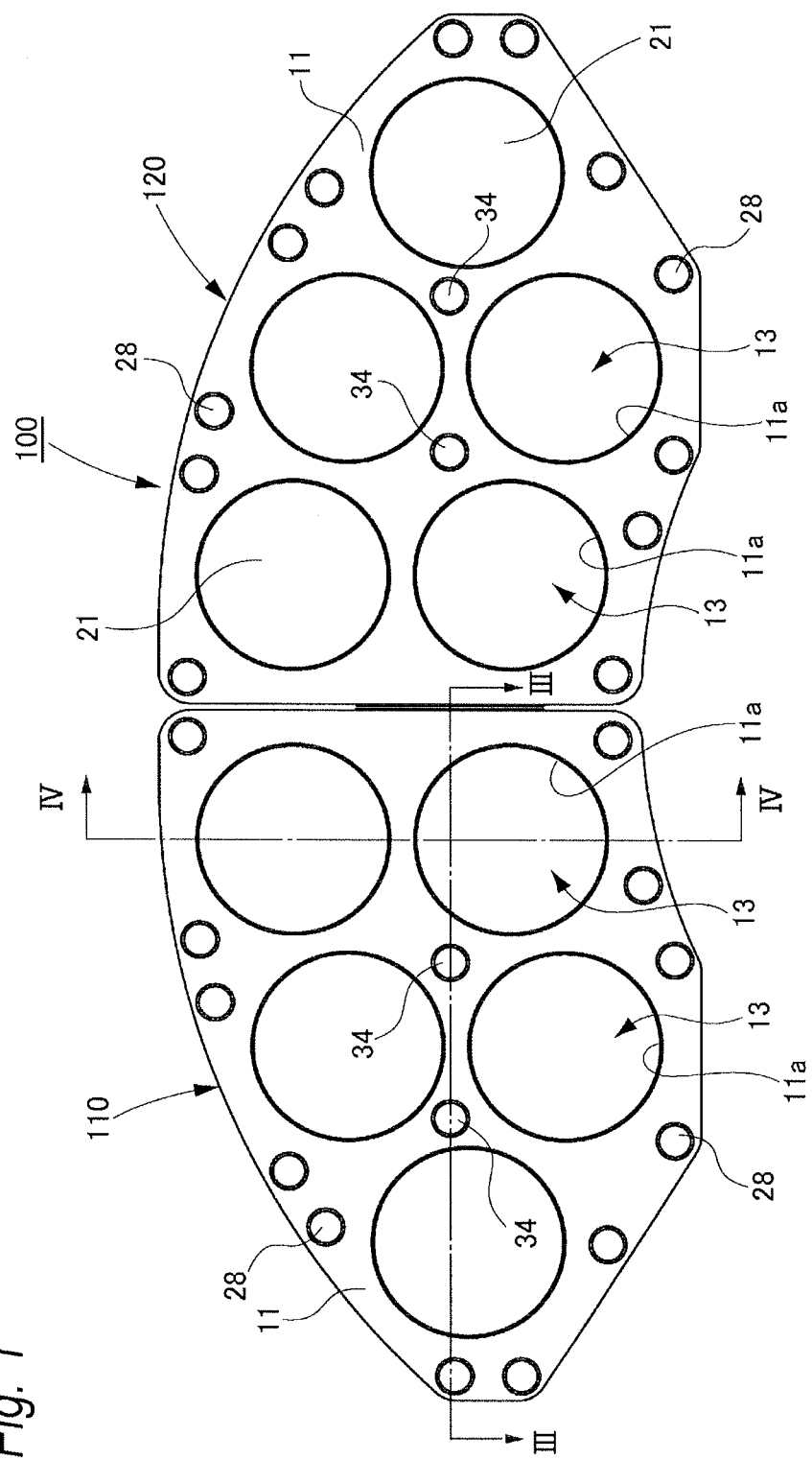
FIG. 1 is a front view of two unit friction pad assemblies constituting a friction pad assembly for a disk brake according to an embodiment of the invention.

As shown in FIG. 1, a friction pad assembly for a disk brake 100 according to the embodiment is used for a railway vehicle disk brake apparatus and is composed of two unit friction pad assemblies 110 and 120 arranged adjacent to each other in the peripheral direction of a disk rotor (not shown) on an axle. The unit friction pad assemblies 110 and 120 are structured similarly. They are respectively disposed opposed to the disk rotor and can be driven to advance and retreat with respect to the disk rotor by an actuator built in a brake caliper (not shown).

Figure 2:
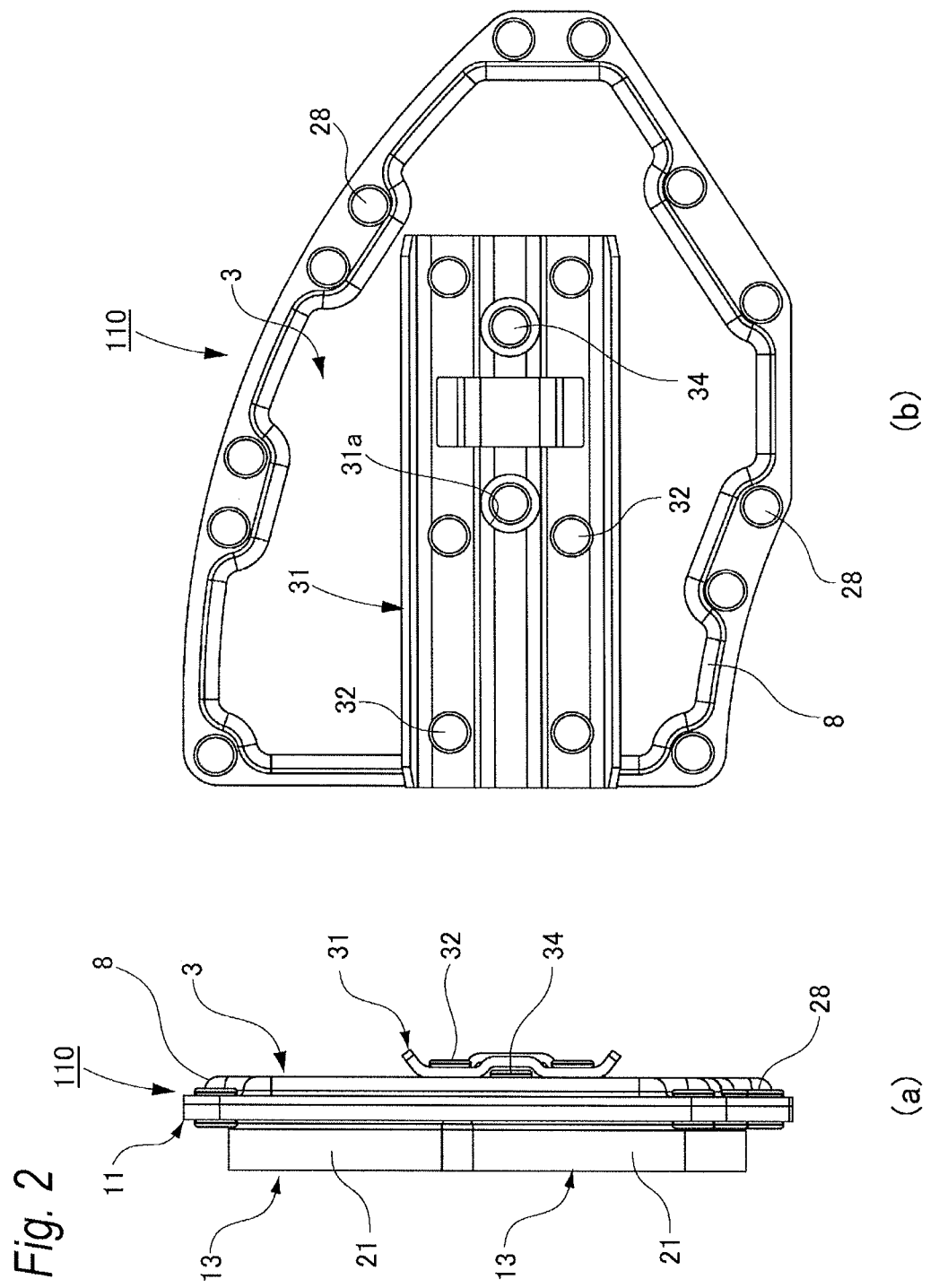
FIG. 2(a) is a side view of one of the two unit friction pad assemblies shown in FIG. 1.
FIG. 2(b) is a back view of the unit friction pad assembly shown in FIG. 2(a).

The friction pad assemblies 110 and 120, as shown in FIGS. 2(*a*) to 6, respectively includes a torque receiving plate 3 driven to advance and retreat with respect to the disk rotor by an actuator (not shown), a rotation preventive plate 5 disposed opposed to the disk rotor side surface (front surface) of the torque receiving plate 3, a guide plate 11 connected and fixed to the disk rotor side of the torque receiving plate 3, and a plurality of (in this embodiment, five) lining assemblies 13 oscillatably engaged with and supported by the guide plate 11.

Figure 3:
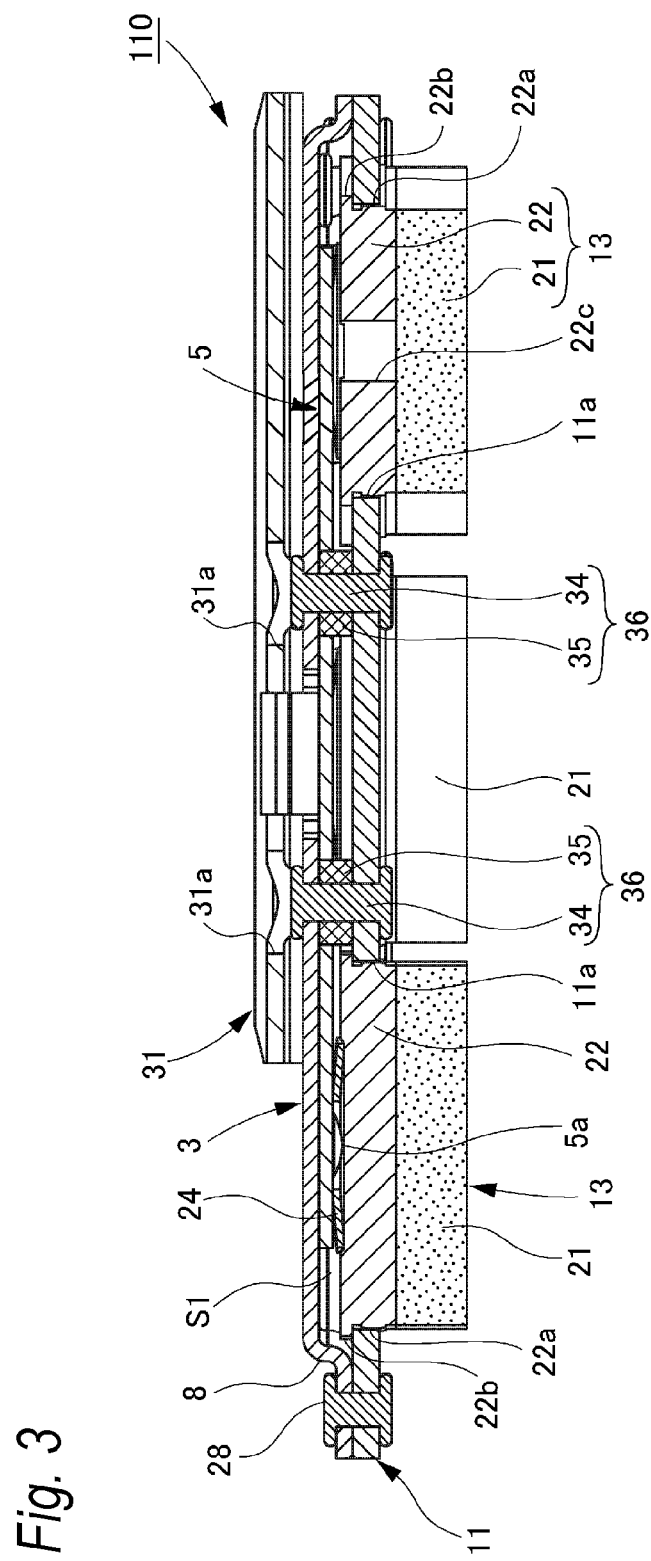
FIG. 3 is a section view taken along the line III-III shown in FIG. 1.
Figure 4:
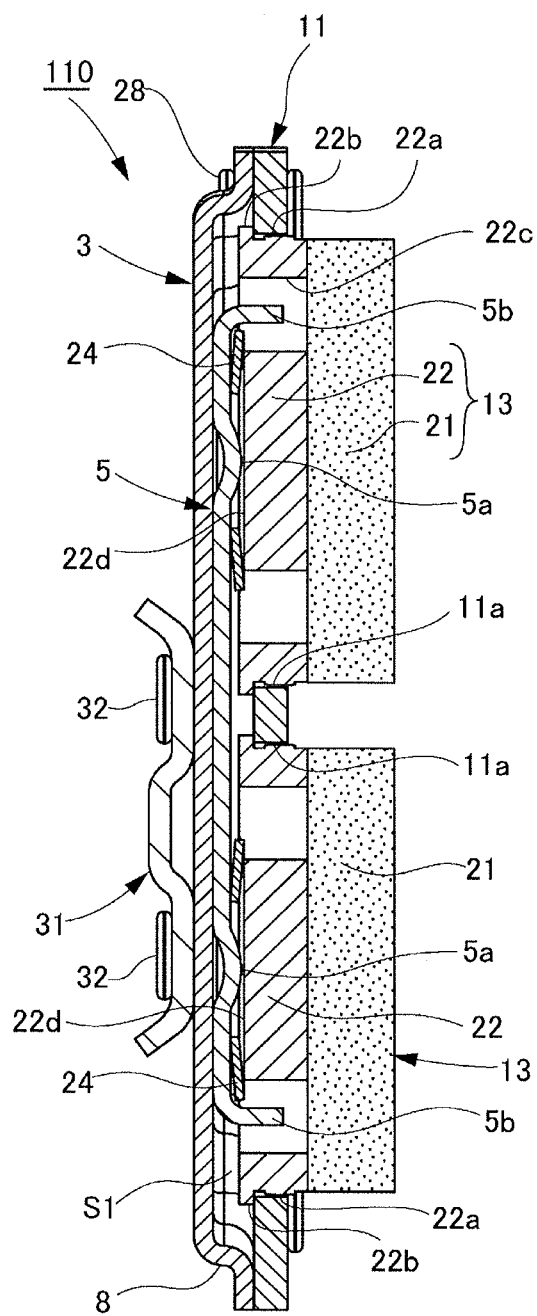
FIG. 4 is a section view taken along the line IV-IV shown in FIG. 1.
Figure 5:
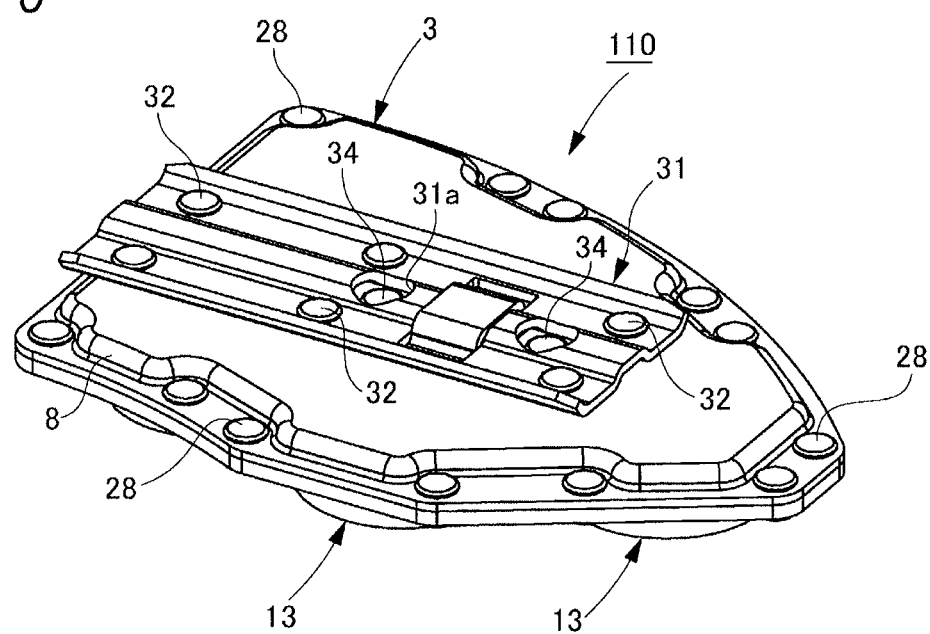
FIG. 5 is a perspective view of the unit friction pad assembly shown in FIG. 2(b), when viewed from the back surface side thereof.
Figure 6:
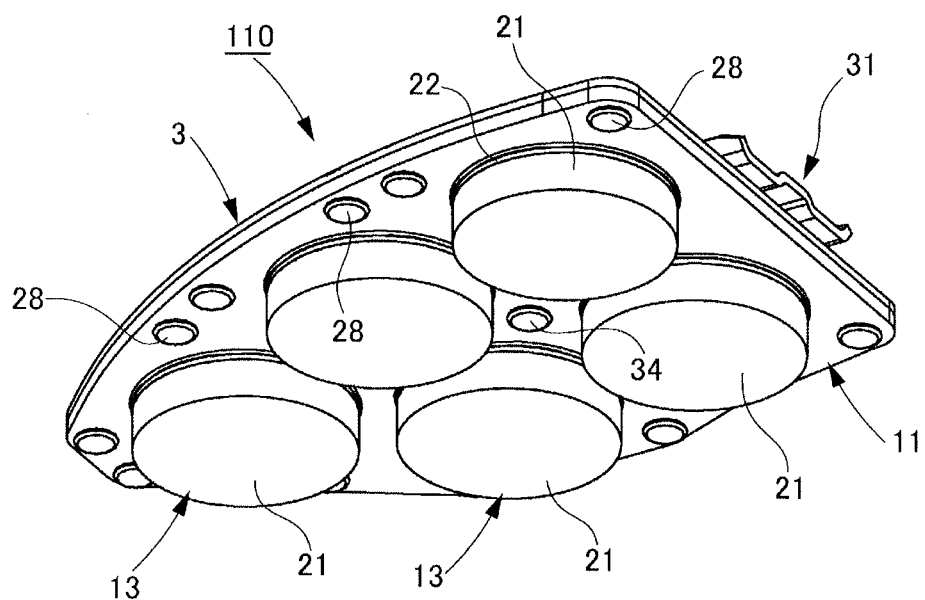
FIG. 6 is a perspective view of the unit friction pad assembly shown in FIG. 2(b), when viewed from the front surface side thereof.
Figure 7:
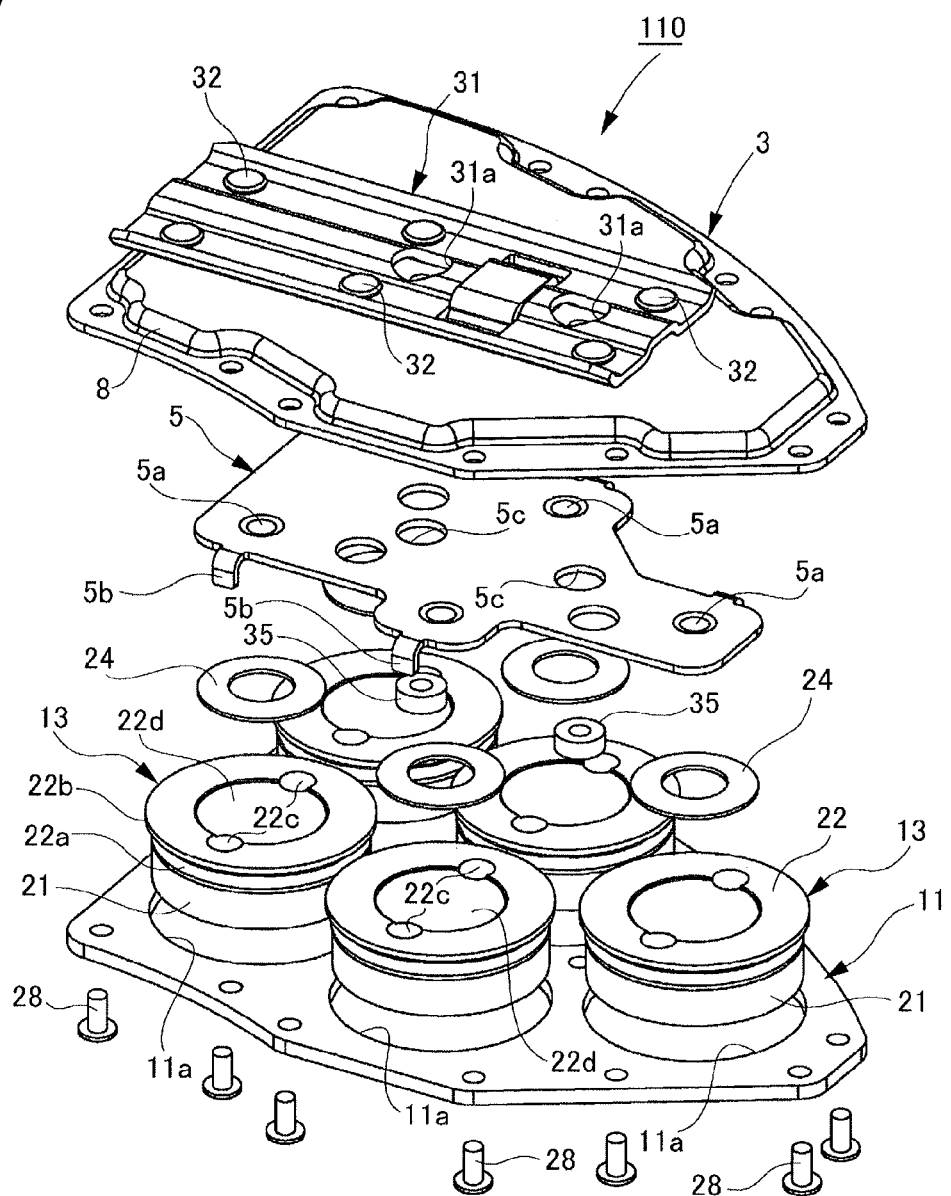
FIG. 7 is an exploded perspective view of the unit friction pad assembly shown in FIG. 2.

While the lining assemblies 13 are inserted and mounted into the guide plate 11 and a spring member 24 (to be explained later) and the rotation preventive plate 5 is mounted on the back surface side of the lining assemblies 13, the torque receiving plate 3 is mounted onto the guide plate 11. The torque receiving plate 3 is formed of a thin flat plate member and, as shown in FIG. 3, in order to provide a clearance S1 between the back plate portion 22 and itself, it has a peripheral wall 8 projects on the peripheral edge portion of the flat plate member for sealing the back surface side of the back plate portion 22. The torque receiving plate 3 is fixed to the outer peripheral portion of the guide plate 11 by a rivet 28 with the clearance S1 between the back plate portion 22 of the lining assembly 13 and itself.

In the vicinity of the central portion of the torque receiving plate 3 having its outer peripheral portion fixed to the guide plate 11 with the clearance S1 between the back plate portion 22 of the lining assembly 13 and itself, there is provided a clearance hold mechanism 36 for holding a clearance between the back surface of the guide plate 11 and the front surface of the torque receiving plate 3.

The clearance hold mechanism 36 of this embodiment includes a hollow cylindrical spacer member 35 interposed between the guide plate 11 and torque receiving plate 3, and a rivet 34, namely, a fastening member which penetrates through the guide plate 11, spacer member 35 and torque receiving plate 3 for holding and fixing them. The fastening member is not limited to the rivet 34 but there can also be used other fastening member such as a bolt/nut and the like.

As shown in FIGS. 2(*a*) to 5, an anchor plate 31 is fixed to the back surface of the torque receiving plate 3 by a rivet 32. The anchor plate 31 is connected to the actuator built in the brake caliper (not shown), thereby enabling the disk brake friction pad assembly 100 to advance and retreat with respect to the disk rotor. In the anchor plate 31, there is opened up a penetration hole 31*a* serving as an operation hole when fastening the rivet 34 of the above clearance hold mechanism 36.

The rotation preventive plate 5 straddles over the plurality of lining assemblies 13 and apply the pressure of the torque receiving plate 5 to the lining assemblies 13. The rotation preventive plate 5 includes back plate contact curved portions (curved projecting portions) 5*a* respectively raised toward the back centers of the back plate portions 22 of the lining assemblies 13, rotation preventive mechanisms 5*b* engaged with rotation preventive engagement holes (engagement portions) 22*c* formed distant from the back centers of the back plate portions 22 of the lining assemblies 13 for preventing the rotation of the lining assemblies 13, and opening portions 5*c* allowing the clearance hold mechanisms 36 to penetrate therethrough.

The guide plate 11, as shown in FIG. 1, includes a plurality of (in this embodiment, five) guide hole portions 11*a* formed at given intervals, while the lining assemblies 13 are mounted on the guide hole portions 11*a* respectively. The guide plate 11 is made of a flat plate member having a given plate thickness capable of, in braking, receiving braking torque applied to the lining assemblies 13 mounted on the guide hole portions 11*a*.

Each lining assembly 13 includes a friction member 21 molded in a substantially disk-like shape and a back plate portion 22 fixed to the back surface of the friction member 21. The back plate portion 22 includes a plate engagement portion 22*a* having an outer peripheral surface oscillatably engageable with a circular guide hole portion 11*a* formed penetratingly in the guide plate 11, and a retaining flange portion 22*b* having an outer diameter than the guide hole portion 11*a*, while they are formed integrally. The back plate portion 22 also includes in its back center a cylindrical spring storing recess 22*d* for storing one end side (outer diameter side) of a spring member 24 (to be explained later). The back plate portion 22 further includes, at positions distant from its back center, a pair of rotation preventive engagement holes 22*c* with which the rotation preventive mechanisms 5*b* of the rotation preventive plate 5 can be engaged.

The friction member 21 has an inner diameter smaller than the inner diameter of the guide hole portion 11*a* so that it can be inserted into the guide hole portion 11*a*. The plate engagement portion 22*a*, in this embodiment, has a curved shape raised toward the guide hole portion 11*a* in order to facilitate the oscillating motion of the lining assembly 13 caused by its sliding contact with the guide hole portion 11*a*.

The lining assembly 13 is inserted and mounted into the guide hole portion 11*a* from the back surface side of the guide plate 11 so that the friction member 21 can project toward the front of the guide plate 11. The lining assembly 13 mounted into the guide hole portion 11*a* is supported while it is urged toward the guide plate 11 by a spring member 24 compressed and mounted between the back surface of the back plate portion 22 opposed to the rotation preventive plate 5 and the front surface of the rotation preventive plate 5.

In this embodiment, the spring member 24 is an annular disc spring having an outer diameter smaller than the inner diameter of the spring storing recess 22*d*. While one end side (outer diameter side) of the spring member 24 is stored in the spring storing recess 22*d*, the other end side (inner diameter side) thereof is projected from the spring storing recess 22*d* and is contacted with the rotation preventive plate 5 to be thereby compressed.

The spring member 24 may preferably have a plate thickness smaller than the back plate contact curved portion 5*a* projectingly provided on the rotation prevented plate 5 and have a spring constant of 0.3-0.8 N/mm/mm$^2$.

The spring member 24, while it is compressed between the rotation preventive plate 5 disposed on the front side of the torque receiving plate 3 fixed to the guide plate 11 and back plate portion 22, urges the lining assembly 13 toward the guide plate 11 so that the retaining flange portion 22*b* can be maintained in contact with the peripheral edge of the guide hole portion 11*a*. In this case, the spring member 24 is mounted between the back surface of the back plate portion 22 and the front surface of the torque receiving plate 3 within the range of 0-60% of an allowable deflection quantity.

Such setting of the spring member 24 can reduce the overload phenomenon of the lining caused by a difference due to the thermal deformation of the rotor surface and a difference between loads applied to the lining assemblies 13.

Figure 8:
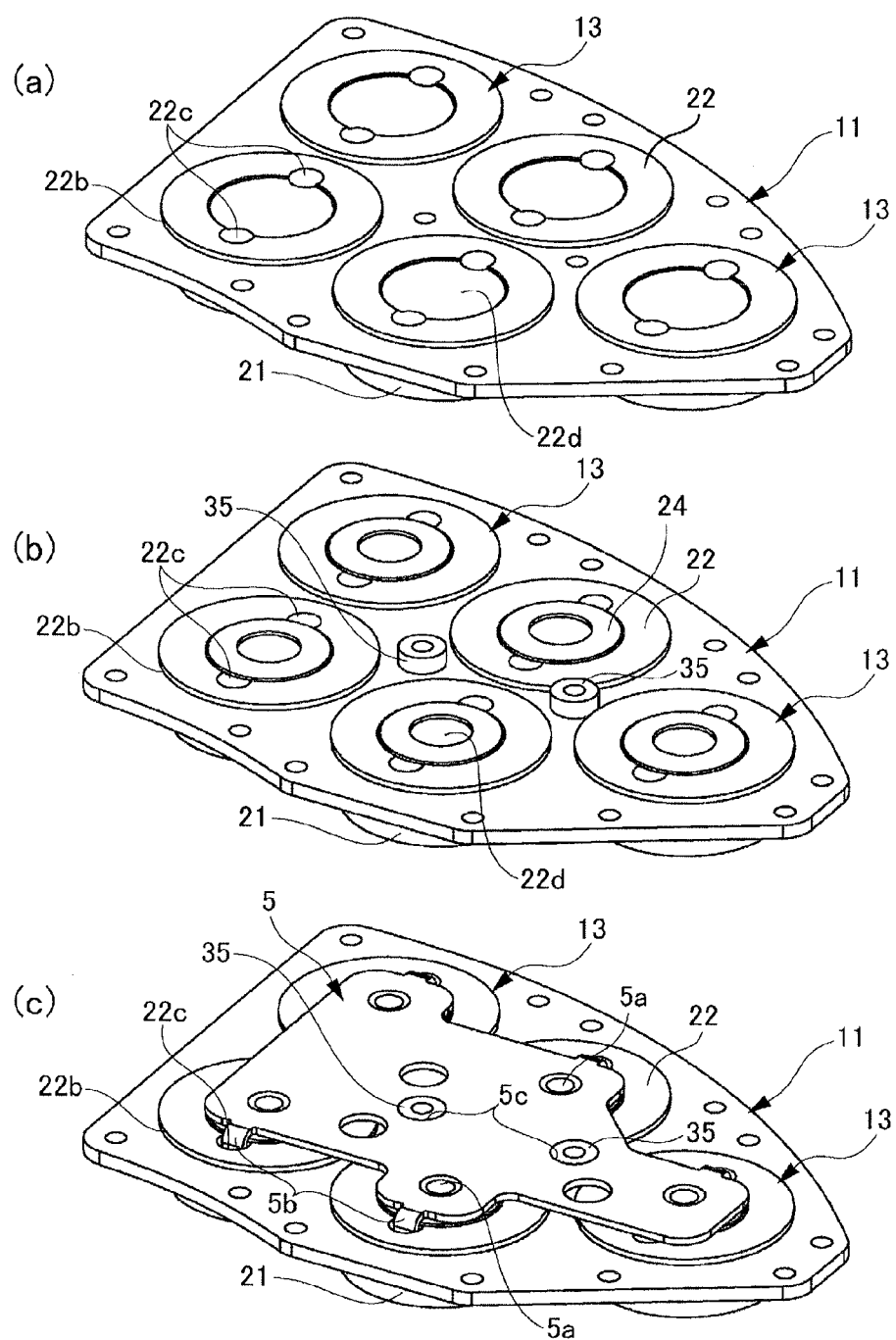
FIGS. 8(a) to 8(c) are perspective views of the unit friction pad assembly shown in FIG. 7, explaining the assembling procedure thereof.

Next, description is given of the assembling procedure of the unit friction pad assembly 110 with reference to FIGS. 8(*a*) to 8(*c*).

Firstly, as shown in FIG. 8(*a*), into the guide hole portion 11*a* of the guide plate 11 set with its back surface facing upward, there is inserted the lining assemblies 13 such that the friction member 21 projects toward the front surface (in the drawings, downward of) the plate 11. After the lining assembly 13 is inserted into the guide hole portion 11*a*, the retaining flange portion 22*b* is in contact with the peripheral edge of the guide hole portion 11*a*.

Next, as shown in FIG. 8(*b*), the spring member 24 is placed in the spring storing recess 22*d* of the back plate portion 22 of each lining assembly 13, and the spacer 35 of the clearance hold mechanism 36 is placed at a given position in the vicinity of the central portion of the guide plate 11.

Further, as shown in FIG. 8(*c*), the rotation preventive plate 5 is placed on the spring members 24 while the back plate contact curved portion 5*a* is opposed to the center of the back surface of the back plate portion 22, the rotation preventive mechanism 5*b* is engaged with the rotation preventive engagement hole 22*c* and the opening 5*c* penetrates through the spacer member 35.

While the spring member 24 and rotation preventive plate 5 are mounted on the back surface side of the lining assembly 13, the torque receiving plate 3 is fixed to the outer peripheral portion of the guide plate 11 by the rivet 28. Further, the vicinity of the central portion of the torque receiving plate 3 and guide plate 11 is held and fixed by the rivet 34 of the clearance hold mechanism 36 penetrating through the guide plate 11, spacer member 35 and torque receiving plate 3.

In the above-described disk brake friction pad assembly 100 of this embodiment, while the torque receiving plate 3 is moved toward the disk rotor by the built-in actuator of the brake caliper to thereby press the friction member 21 against the disk rotor, when a pressing load acting on the friction member 21 exceeds a set load, the spring member 24 is deflected to bring the back surface of the back plate portion 22 into contact with the back plate contact curved portion 5*a* of the rotation preventive plate 5 and the back plate contact curved portion 5*a* permits the inclination of the lining assembly 13.

Such area of the back plate portion (the bottom surface of the spring storing recess 22*d*) of the back plate portion 22 as is contacted by the back plate contact curved portion 5*a* is finished as a flat and smooth surface so that, in the oscillation of the lining assembly 13, the contact point is allowed to move freely with the oscillation.

In the disk brake friction pad assembly 100 of this embodiment, referring to the position of the lining assembly 13 with respect to the torque receiving plate 3, in a direction parallel to the disk rotor surface of the lining assembly 13, it is regulated by the engagement between the plate engagement portion 22*a* of the lining assembly 13 and the guide hole portion 11*a* of the guide plate 11 and, in a direction perpendicular to the disk rotor surface, it is regulated by the energizing force of the spring member 24 interposed between the back surface of the back plate portion 22 and the rotation preventive plate 5 disposed on the front surface side of the torque receiving plate 3.

Therefore, a braking torque applied to the lining assembly 13 in braking is transmitted to the guide plate 11 and is transmitted direct to the torque receiving plate 3 to which the guide plate 11 is fixed.

A pressure pressing the lining assembly 13 against the disk rotor in braking is applied from the torque receiving plate 3 through the rotation preventive plate 5 and spring member 24 to the lining assembly 13.

That is, a member (the guide plate 11) for receiving the braking force from the lining assembly 13 and members (rotation preventive plate 5 and torque receiving plate 3) for applying the pressure to the lining assembly 13 are provided separately, while a braking torque providing a large load is not applied to the contact portion between the spring member 24 for applying the pressure to the lining assembly 13 and rotation preventive plate 5 nor to the contact portion between the rotation preventive plate 5 and torque receiving plate 3.

Therefore, the contact portions between the spring member 24 for transmitting the pressure and lining member 13 or rotation preventive plate 5 need not be engaged using a strong member such as a ball joint for receiving a braking torque, thereby easing working precision. This can realize reduced cost and enhanced productivity.

In the above-described disk brake friction pad assembly 100; the plurality of lining assemblies 13 are arranged in a plane state. Since the spring members 24 interposed between the back surfaces of the lining assemblies 13 and rotation preventive plate 5 absorb the thickness direction dimension tolerance of the lining assemblies 13, the contact performance of the lining assemblies 13 with the disk rotor can be prevented from varying.

Therefore, stable braking characteristics can be maintained free from the influence of the thickness direction dimension tolerance of the lining assemblies 13.

In the above-described disk brake friction pad assembly 100, the guide plate 11 and torque receiving plate 3 are fastened together in their outer peripheral portions by the rivet 28 to provide an integral box structure, and the clearance hold mechanism 36 is disposed in the vicinity of the central portions of the torque receiving plate 3 and guide plate 11, while it can support a portion of the pressure acting on the torque receiving plate 3 in the vicinity of the central portions of the torque receiving plate 3. Thus, the rigidity of the torque receiving plate 3 with its outer peripheral portion fixed to the guide plate 11 is higher than when the clearance hold mechanism 36 is not disposed, thereby being able to reduce the plate thickness of the torque receiving plate 3. This can ease the working precision of parts used and can reduce the weights thereof, which can realize reduced cost and enhanced productivity.

In the above-described disk brake friction pad assembly 100, the back plate contact curved portions 5*a* for supporting the lining assemblies 13 so that the lining assemblies 13 is inclined when the pressing load acting on the friction member 21 exceeds a set load is formed integrally with the rotation preventive plate 5, while an independent exclusive part such as a universal joint is not added. This can avoid increased cost caused by the increased number of parts and degraded productivity caused by the increased number of steps.

In the above-described disk brake friction pad assembly 100, the guide plate 11 for receiving a braking torque acting on the lining assemblies 13 mounted into the guide hole portions 11*a* is formed of a flat plate member having a given plate thickness. This enables the inner peripheral surface of the guide plate 11 extending in the plate thickness direction of the guide hole portions 11*a* to receive braking torque applied from the lining assemblies 13 in braking. Thus, the guide plate 11 having a given plate thickness and have sufficient rigidity, differently from the guide hole portions of a guide plate produced by bending a thin plate member, eliminates a fear that the guide hole portions can be bent deformed by braking torque applied from the lining assemblies and can secure smooth oscillation in the guide hole portions 11a of the lining assemblies 13.

In the above-described disk brake friction pad assembly 100, for transmission of braking torque, the plate engagement portion 22a to be contacted with the inner surface of the guide hole portion 11a of the guide plate 11 has a curved surface raised toward the guide hole portion 11a. Therefore, in the oscillation of the lining assembly 13, the plate engagement portion 22a is able to slide on the inner peripheral surface of the guide hole portion 11a with a low friction force, whereby the oscillation of the lining assembly 13 caused by sliding contact between the plate engagement portion 22a and guide hole portion 11a can be made smooth.

In the above-described disk brake friction pad assembly 100, the back plate portion 22 includes the spring storing recess 22d for storing one end side (outer diameter side) of the spring member 24. This can position the spring member 24 between the back plate portion 22 and torque receiving plate 3, and can prevent a position clearance between the back plate portion 22 and rotation preventive plate 5 from increasing. Thus, the dimension of the disk brake friction pad assembly 100 in a direction perpendicular to the sliding surface of the disk rotor can be reduced and thus the size thereof can be made compact.

In the above-described disk brake friction pad assembly 100, to enhance the transmission efficiency of braking torque when the lining assembly 13 is contacted with the disk rotor, the rotation regulation of the lining assembly 13 within a plane parallel to the disk rotor surface is carried out by the engagement between the engagement hole 22c formed in the back plate portion 22 of the lining assembly 13 and rotation preventive mechanism 5b projectingly provided on the rotation preventive plate 5. That is, since an independent exclusive part is not added to regulate the rotation of the lining assembly 13 within a plane parallel to the disk rotor surface, there is no need to increase a part for the rotation regulation of the lining assembly 13. This can avoid increased cost caused by the increased number of parts and degraded productivity caused by the increased number of steps.

Figure 9:
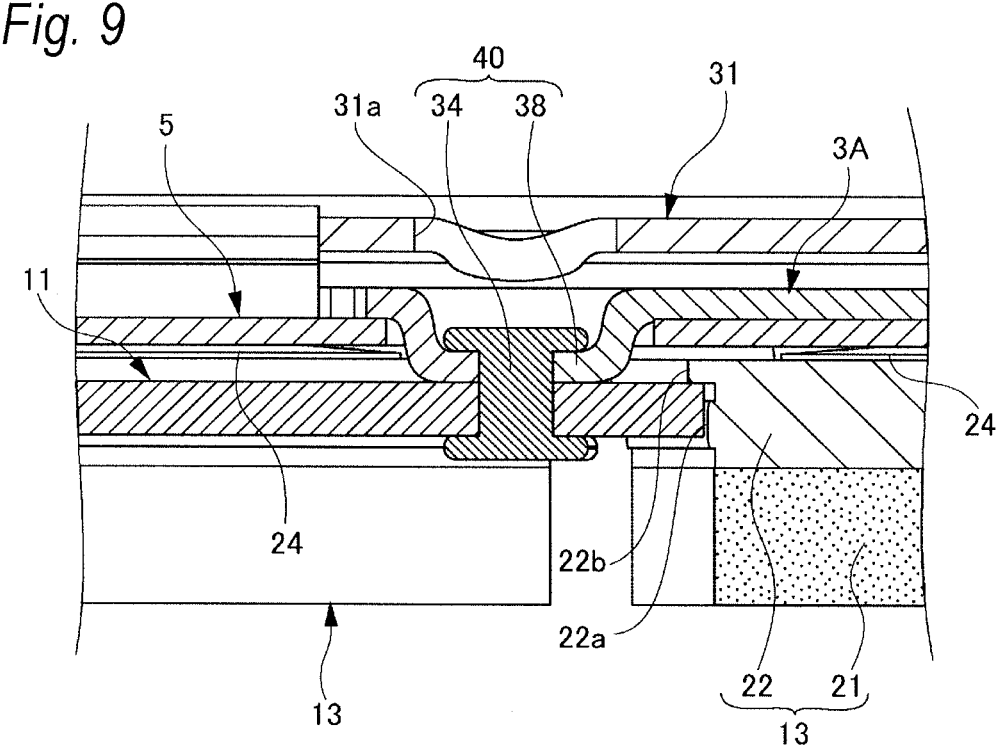
FIG. 9 is an enlarged section view of a modification of a main portion of a clearance hold mechanism shown in FIG. 3.

FIG. 9 is an enlarged section view of a modification of the main portion of the clearance hold mechanism 36 shown in FIG. 3.

A clearance hold mechanism 40 shown in FIG. 9 includes a contact portion 38 formed by swelling a given portion (a portion) of the vicinity of the central portion of a torque receiving plate 3A in a direction opposed to the guide plate 11 by drawing or the like, and a rivet 34 as a fastening member penetrating through the guide plate 11 and contact portion 38 to thereby fasten and fix them together. Here, instead of the fastening fixation by the rivet 34, the guide plate 11 and contact portion 38 can also be fixed together.

The clearance hold mechanism 40, similarly to the clearance hold mechanism 36, can support a portion of pressure acting on the torque receiving plate 3A in the vicinity of the central portion thereof in braking. Thus, the rigidity of the torque receiving plate 3A with its outer peripheral portion fixed to the guide plate 11 is higher than when the clearance hold mechanism 40 is not provided, thereby being able to reduce the plate thickness of the torque receiving plate 3A itself.

Here, the characteristics of the embodiment of the above-mentioned disk brake friction pad assembly of the invention are briefly summarized in the following items i-vi.

[i] A disk brake friction pad assembly 100 in which a plurality of lining assemblies 13 oscillatably supported by a guide plate 11 for receiving a braking torque and the lining assemblies 13 are pressed to a disk rotor, wherein each of the lining assemblies 13 includes, in a back plate portion 22 thereof fixed to a back of a friction member 21, a plate engagement portion 22a with its outer peripheral surface oscillatably engaged with a guide hole portion 11a formed in the guide plate 11 and a retaining flange portion 22b having an outer diameter larger than the guide hole portion 11a, wherein each of the lining assemblies 13 is inserted into the guide hole portion 11a from the back side of the guide plate 11, transmits a braking torque applied when the disk rotor contacts with the friction member 21 from the plate engagement portion 22a to the guide plate 11, wherein each of the lining assemblies 13 is supported and urged toward the guide plate 11 by a spring member 24 provided on the back side of the back plate portion 22, and wherein a clearance hold mechanism 36 for holding a clearance between the guide plate 11 and a torque receiving plate 3 is provided in the vicinity of a central portion of a torque receiving plate 3 and the guide plate 11, the torque receiving plate 3 being spaced by a clearance S1 from the back plate portion 22 and an outer periphery of the torque receiving plate 3 being fixed to the guide plate 11.

[ii] The disk brake friction pad assembly 100 according to the item [i], wherein a rotation preventive plate 5 straddling over the lining assemblies 13 to apply a pressure from the torque receiving plate 3 to the lining assemblies 13 is provided between the torque receiving plate 3 and the guide plate 11, and the rotation preventive plate 5 includes a rotation preventive mechanism 5b engaged with an engagement portion (engaging hole) 22c formed distant from the center of the back of each back plate portion 22 to prevent each lining assembly 13 against rotation and an opening 5c through which the clearance hold mechanism 36 penetrates.

[iii] The disk brake friction pad assembly 100 according to the item [ii], wherein the rotation preventive plate 5 includes a plurality of curved projecting portions (back plate contact curved portions) 5a formed so as to project toward the center of the back of each back plate portion 22.

[iv] The disk brake friction pad assembly 100 according to the item [iii], wherein the spring member 24 is a disc spring having a plate thickness smaller than a height of the curved projecting portion (back plate contact curved portions) 5a and having a spring constant of 0.3-0.8 N/mm/mm$^2$, and is mounted between the back plate portion 22 and the torque receiving plate 3 within the range of 0-60% of an allowable deflection quantity.

[v] The disk brake friction pad assembly 100 according to any one of the items [i]-[iv], wherein the clearance hold mechanism 36 includes a spacer member 35 interposed between the guide plate 11 and the torque receiving plate 3 and a fastening member (rivet) 34 penetrating through the guide plate 11, the spacer member 35 and the torque receiving plate 3 to fix them together.

[vi] The disk brake friction pad assembly 100 according to any one of the items [i]-[iv], wherein the clearance hold mechanism 40 swells at least one of a portion of the guide plate 11 and a portion (specified portion) of the torque receiving plate 3A in an opposing direction into contact with the other, and fixes the contacted portion (contact portion) 38.

Here, the disk brake friction pad assembly of the invention is not limited to the above embodiment but proper changes and improvements are possible.

For example, when a disk brake friction pad assembly is constituted of plurality of unit friction pad assemblies, the number of unit friction pad assemblies may be one or three or more.

In the disk brake friction pad assembly 100 of the above embodiment, description has been given of the structure that, between the torque receiving plate 3 and guide plate 11, there is interposed the rotation preventive plate 5 which is disposed to straddle over the plurality of lining assemblies 13 and applies the pressure from the torque receiving plate 3 to these lining assemblies 13. However, the invention is not limited to this. That is, for example, a curved projecting portion raised toward the torque receiving plate may be formed on the back of the back plate portion and the rotation preventive mechanism for preventing the outer peripheral surface of the back plate portion from rotating relative to the guide hole portion may be interposed between the back plate portion and the guide hole portion, thereby omitting the rotation preventive plate.

The present application is based on the Japanese Patent Application (No. 2012-086733) filed on Apr. 5, 2012 and thus the contents thereof are incorporated herein for reference.

INDUSTRIAL APPLICABILITY

According to the disk brake friction pad assembly of the invention, due to the eased working precision of parts used and reduced weight thereof, reduced cost and enhanced productivity can be realized.

REFERENCE SIGNS LIST

3: torque receiving plate
5: rotation preventive plate
5a: back plate contact curved portion (curved projecting portion)
11: guide plate
11a: guide hole portion
13: lining assembly
21: friction member
22: back plate portion
22a: plate engagement portion
22b: retaining flange portion
22c: engagement hole (engagement portion)
22d: spring storing recess
24: spring member
28: rivet
31: anchor plate
34: rivet (fastening member)
35: spacer member
100: disk brake friction pad assembly
110, 120: unit friction pas assembly

The invention claimed is:

1. A disk brake friction pad assembly in which a plurality of lining assemblies are oscillatably supported by a guide plate for receiving a braking torque and the lining assemblies are pressed to a disk rotor,
wherein each of the lining assemblies includes a back plate portion thereof fixed to a back of a friction member, a plate engagement portion with its outer peripheral surface oscillatably engaged with a guide hole portion formed in the guide plate and a retaining flange portion having an outer diameter larger than the guide hole portion,
wherein each of the lining assemblies is inserted into the guide hole portion from the back side of the guide plate, transmits a braking torque applied when the disk rotor contacts with the friction member from the plate engagement portion to the guide plate,
wherein each of the lining assemblies is supported and urged toward the guide plate by a spring member provided on the back side of the back plate portion,
wherein a clearance hold mechanism for holding a clearance between the guide plate and a torque receiving plate is provided in the vicinity of a central portion of the torque receiving plate and the guide plate, the torque receiving plate being spaced by a clearance from the back plate portion and an outer periphery of the torque receiving plate being fixed to the guide plate,
wherein a rotation preventive plate straddling over the lining assemblies to apply a pressure from the torque receiving plate to the lining assemblies is provided between the torque receiving plate and the guide plate, and
wherein the rotation preventive plate includes a rotation preventive mechanism engaged with an engagement portion formed distant from the center of the back of each back plate portion to prevent each lining assembly against rotation and an opening through which the clearance hold mechanism penetrates.

2. The disk brake friction pad assembly according to claim 1, wherein
the rotation preventive plate includes a plurality of curved projecting portions formed so as to project toward the center of the back of each back plate portion.

3. The disk brake friction pad assembly according to claim 2, wherein
the spring member is a disc spring having a plate thickness smaller than a height of the curved projecting portion and having a spring constant of 0.3-0.8 N/mm/mm2, and is mounted between the back plate portion and the torque receiving plate within the range of 0-60% of an allowable deflection quantity.

4. The disk brake friction pad assembly according to claim 1, wherein
the clearance hold mechanism includes a spacer member interposed between the guide plate and the torque receiving plate and a fastening member penetrating through the guide plate, the spacer member and the torque receiving plate to fix them together.

5. The disk brake friction pad assembly according to claim 1, wherein
the clearance hold mechanism swells at least one of a portion of the guide plate and a portion of the torque receiving plate in an opposing direction such that the guide plate contacts the torque receiving plate, and fixes the contacted portion.

* * * * *